United States Patent [19]

Mookil

[11] 4,294,634
[45] Oct. 13, 1981

[54] METHOD FOR MANUFACTURING A SOLID STATUE

[76] Inventor: Byun Mookil, 190, Simkoc-dong, Buchyun-shi, Kyungki-do, Rep. of Korea

[21] Appl. No.: 136,267

[22] Filed: Apr. 1, 1980

[51] Int. Cl.³ .................... B32B 31/22; B44C 3/02; G09B 25/00

[52] U.S. Cl. .................................. 156/59; 46/1 F; 46/22; 156/61; 156/63; 156/300; 428/13; 428/15; 428/16; 428/79; 430/11; 430/403; 430/496; 434/82; 434/84; 434/267

[58] Field of Search .......... 35/27, 41; 40/615; 46/16, 22, 1 F; 156/58, 59, 63, 300, 61; 264/220; 273/157 R; 428/13, 15, 79, 16; 430/11, 40, 3, 432, 496; 434/82, 84, 267

[56] References Cited

U.S. PATENT DOCUMENTS

| | | | |
|---|---|---|---|
| 678,262 | 7/1901 | Lembacher | 156/59 |
| 1,954,325 | 4/1934 | Martinez | 430/11 |
| 3,520,078 | 7/1970 | Klamer | 46/22 |
| 3,539,410 | 11/1970 | Meyer | 156/58 |
| 3,751,827 | 8/1973 | Gaskin | 35/41 X |
| 3,868,283 | 2/1975 | Scheyer | 156/58 |
| 3,982,936 | 9/1976 | Goffe | 430/11 |
| 4,122,628 | 10/1978 | Crowell et al. | 46/22 X |
| 4,132,575 | 1/1979 | Suzuki et al. | 156/58 |
| 4,239,359 | 12/1980 | Morioka | 156/58 X |

*Primary Examiner*—Robert A. Dawson
*Attorney, Agent, or Firm*—Holman & Stern

[57] ABSTRACT

A method for manufacturing model statues or profile pictures wherein a base shape or body and various components are made from a flexible material, such as synthetic resins, clay, gypsum, wood or rubber. The various components are glued in place on the body. A thin covering of cloth or paper is then placed over the body with the glued components to apply an even finish to the surface of the body.

7 Claims, 13 Drawing Figures

FIG. IC
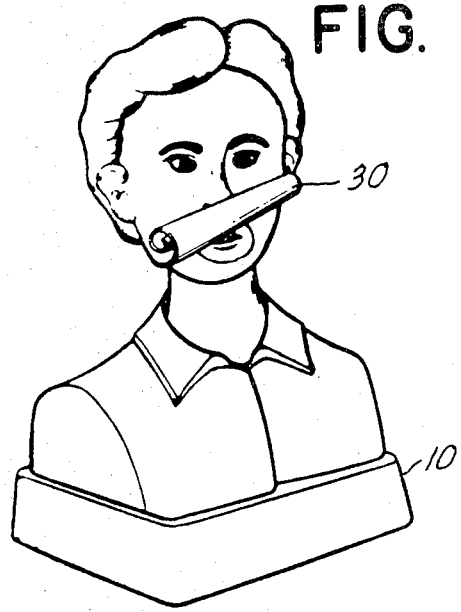
FIG. ID

METHOD FOR MANUFACTURING A SOLID STATUE

BACKGROUND OF THE INVENTION

1. Field of the Invention

This invention relates to a method of manufacturing a solid statue. More particularly, the invention relates to a method for manufacturing, on an industrial scale, a solid figure-painting, a solid landscape, a solid animal-painting or the like.

2. Brief Description of Prior Art

Hitherto, a statue in the image of a human being or an animal could be sculptured only by a carver, and such carving requires much time and effort in finishing the statue. Also, in another method for producing a reproduced statue by molding it from a sculpture already sculptured, it is possible to produce the same in mass production in a short period of time, however, since it has the same shape, there is never any artistic value found in it.

SUMMARY OF THE INVENTION

This invention relates to a method for manufacturing a solid statue, which comprises preparing a base shape or solid basic body and various parts or components of flexible materials such as synthetic resin, clay, gypsum, wood and rubber; glueing said parts or components in place at said shape or body depending upon the worker's aesthetic feeling; and covering a thin paper or cloth over the resulting work to finish the same. Therefore, according to the invention, it is possible to manufacture in a short time on an industrial scale, various statues capable of providing a separate aesthetic sense.

According to the invention, the base or basic shape or body may be a figure-painting, a landscape or a statue not having a complete shape. The parts or components may be fitted as required for completing the painting, landscape or statue. In other words, the base and parts are separately prepared in advance. Thus, the invention concerns a method for obtaining a finished work using the base and parts.

It is the primary object of this invention to provide a method for manufacturing a solid statue.

It is another object of this invention to provide a solid statue affording an aesthetic sense.

These, together with other objects and advantages, will become apparent to those skilled in the art upon reading the details of the method and construction which are more fully set forth below.

BRIEF DESCRIPTION OF THE DRAWINGS

FIGS. 1(a), 1(b), 1(c) and 1(d) show an embodiment according to the invention;

DESCRIPTION OF THE PREFERRED EMBODIMENTS

EXAMPLE 1

Figure 1A:
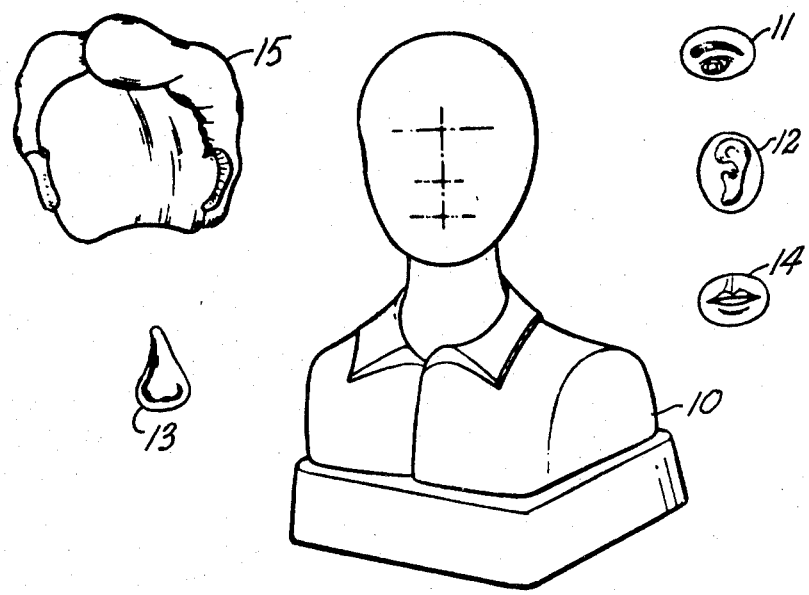
Figure 1B:
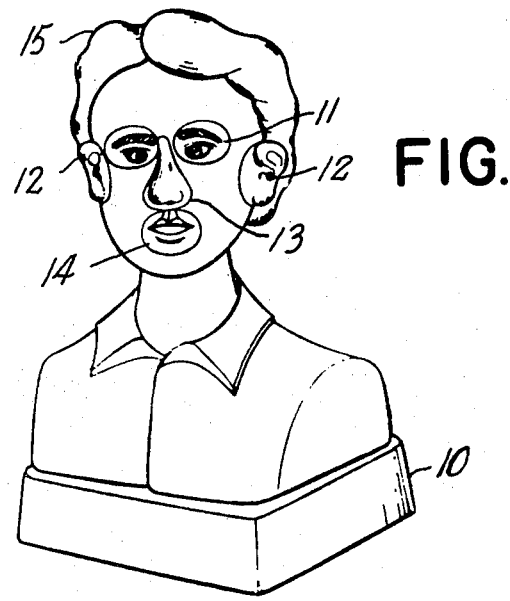
Figure 2A:
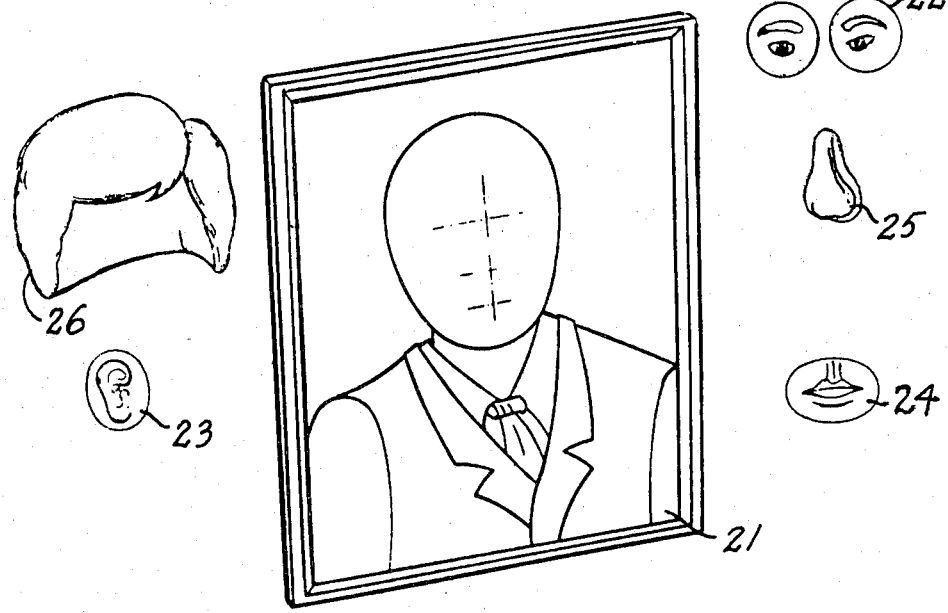
FIGS. 2(a), 2(b), 2(c) and 2(d) show another embodiment of the invention.
Figure 2B:
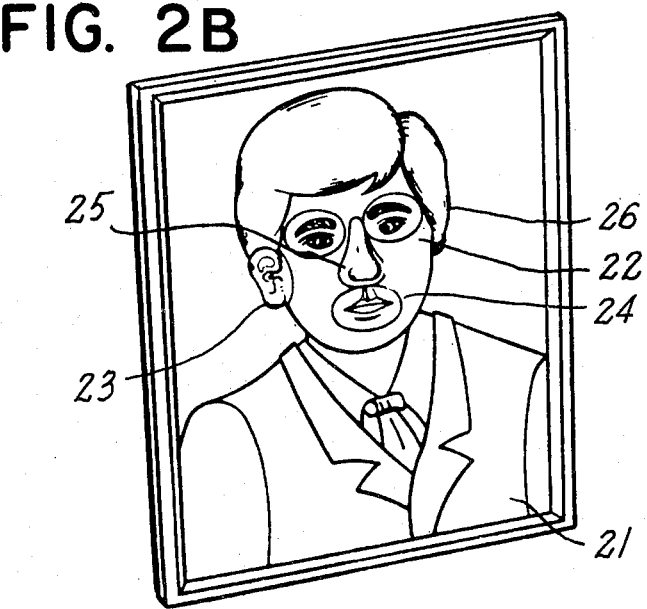
Figure 2C:
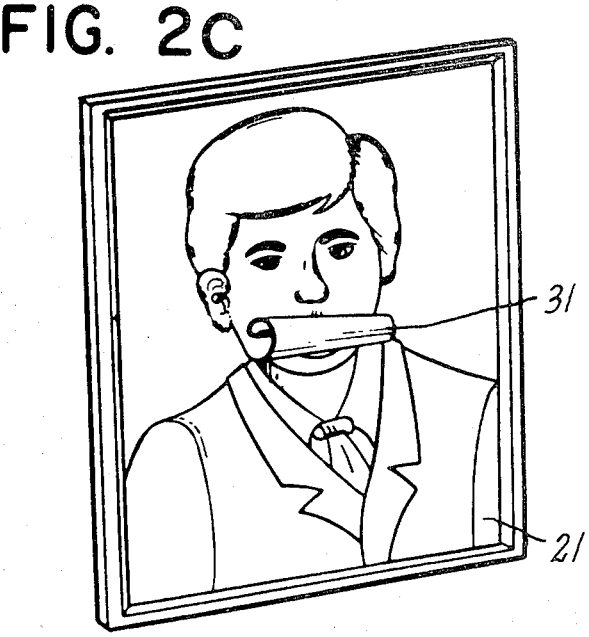
Figure 2D:
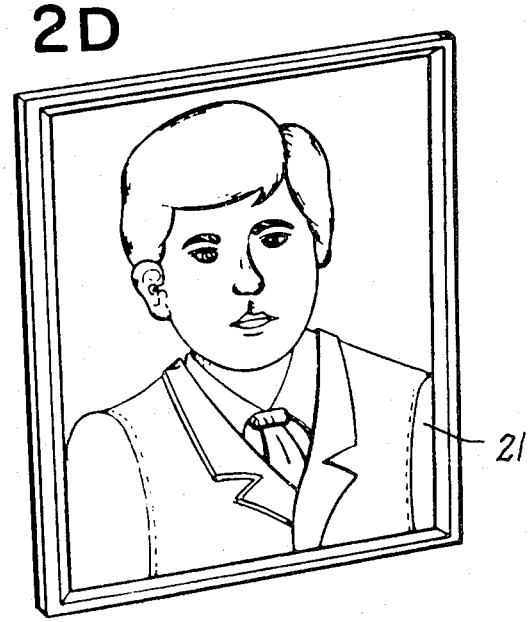
Figure 3A:
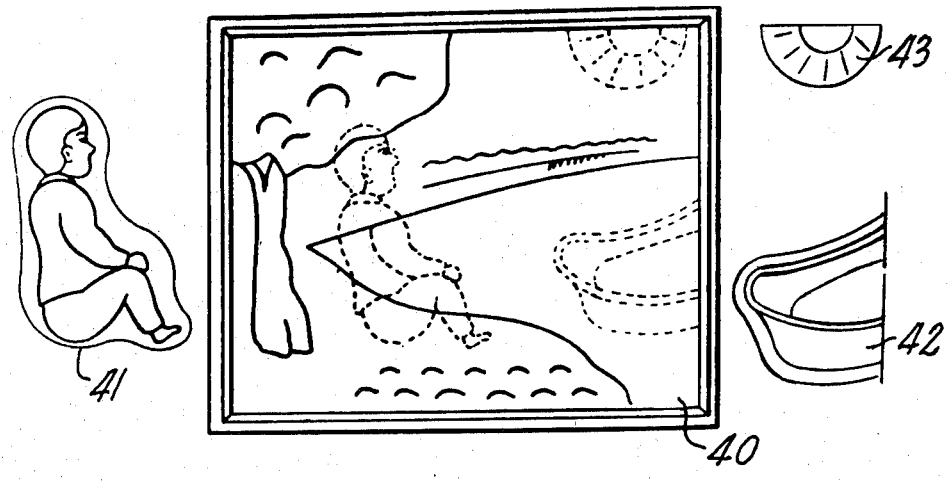
FIGS. 3(a), 3(b), 3(c) 3(d) and 3(e) show still another embodiment similar to FIGS. 1 and 2.
Figure 3B:
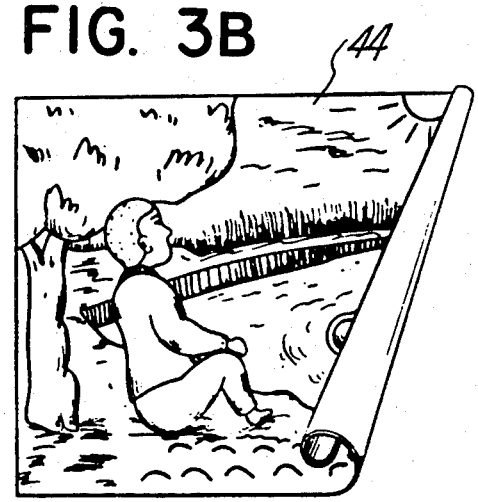
Figure 3C:
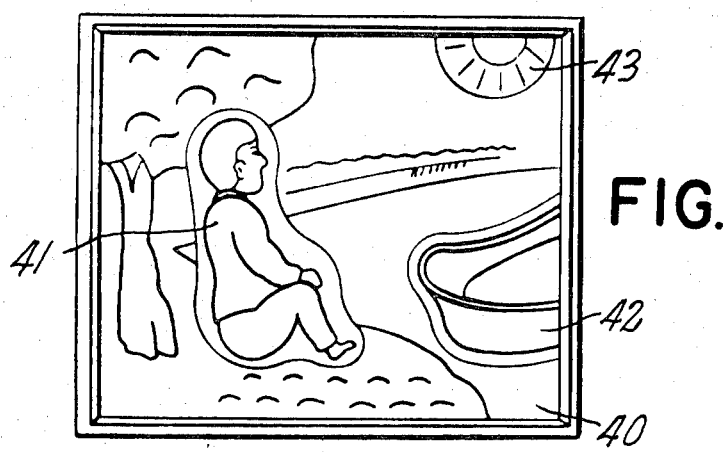
Figure 3D:
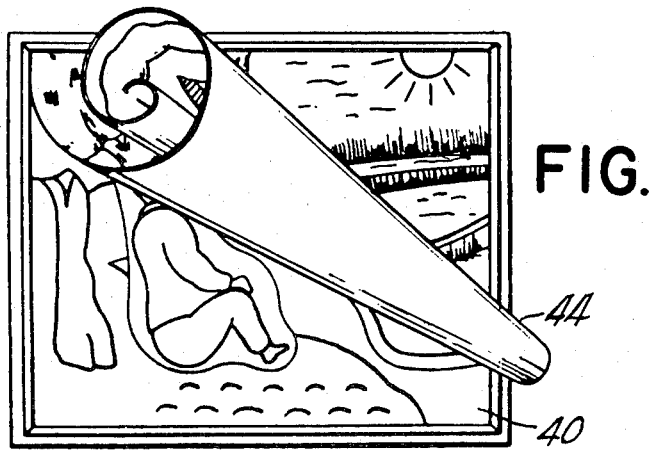
Figure 3E:
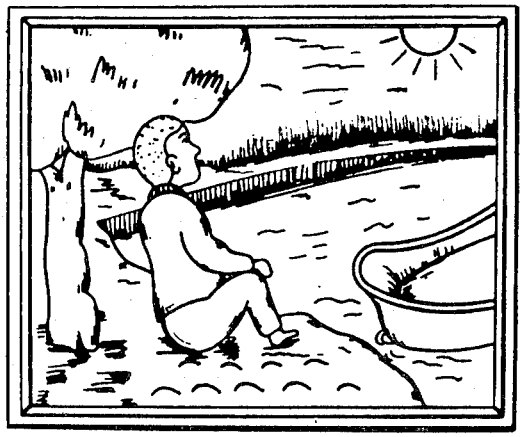

As shown in FIG. 1, a basic body 10 is made of rubber, synthetic resin or wooden material, which is shaped as a bust of a human being, and then other components, that is, for example, eyes, nose, mouth and ears are made of the same material, which are to be placed on the parts of face. As seen from FIGS. 1(a) to 1(d), to the part of the face of the basic body 1, the respective parts of eyes 11, ears 12, nose 13, mouth 14 and hair 15 are attached in place to form the statue of FIG. 1(b) by means of an adhesive, referring to a model photo of the subject posing for the statue. Thereafter, the pattern of the attachments is cut off or modified and a thin covering 30, a cloth is adhesively covered thereon as seen in FIG. 1(c). After drying it, a varnish or paint is applied to give a solid and lifelike statue.

EXAMPLE 2

As shown in FIG. 2, on the base panel of a photo frame, a basic shape 21, which is a three dimensional solid body, is formed, said shape being made of the material as used in Example 1. Also, in a manner similar to Example 1, the components eyes 22, ears 23, mouth 24, nose 25 and hair 26 are attached in place to the part of face by means of glue or an adhesive, referring to a model shape or photo of the subject whose image is being formed as seen in FIG. 2(b). At this time, the semi-finished work is adhesively covered by a covering, a cloth 31, as seen in FIG. 2(c) or by a sensitized sheet and then through a negative film corresponding to the work it may be exposed to the light to give a solid white-black or colour portrait.

EXAMPLE 3

This example is to provide a three dimensional solid landscape. As shown in FIG. 3, on a base panel 40 of the materials similar to those as used in Examples 1 and 2, a basic drawing 40 is outlined. The worker can arrange the components, for instance, trees, river, hill (not shown), man 41, vessel 42, sun 43 or the like, which are already prepared of the same materials, are fixed in place on the basic drawing 40 (on the base panel) by means of glue or adhesive. Thereover, a thin cloth 44, on which a drawing is painted corresponding to that on the panel, adhesively covers and is dried to afford a solid colour and lifelike landscape.

In the above Examples 1 and 2, there is an illustration as embodiments of a method for preparing a solid statue and solid potrait respectively of a human being. In example 3, a method for manufacturing a solid landscape or a special statue for interior decoration is illustrated. Therefore, according to the invention, it will be noted that any type of a solid statue may be manufactured.

In addition, it should be understood that, upon finishing the work acccording to the invention, the painting or coloring steps may be omitted depending on the properties of the materials of the base 1 and the components to promote an aesthetic sense.

The covering operation of a covering 30, a thin paper or cloth 3, for example, in the invention is to conceal the surface imperfections formed by the adhering portions of the base 10 with the components 11-15. However, instead of such a covering, the adhering portions may be polished by sandpaper and the like in case that clay or gypsum is used as a material.

As stated above, according to an example of the invention, even if the same base 10 and components 11-15 are used, a different solid statue can be created depending upon the aesthetic feeling of its manufacturer.

The present invention has been shown and described in what is considered to be the most practical, and most preferred, embodiments. It is recognized, however that departure may be made therefrom within the scope of the invention and that obvious modifications will occur to persons skilled in the art.

What I claim is:

1. A method of producing a three-dimensional solid art object comprising:

forming a solid basic body and component parts from a shapeable art medium in initial shapes corresponding approximately to those of said solid basic body and said component parts when said three-dimensional solid art object is assembled and finished, adhesively attaching said component parts on said solid basic body to form an assembled object with a three-dimensional surface;

adhesively and conformationally attaching a covering sheet to the three-dimensional surface of said assembled object to form said three-dimensional solid art object.

2. The method of producing a three-dimensional art object of claim 1, wherein the three-dimensional surface of said assembled object is further modified in shape.

3. The method of producing a three-dimensional art object of claim 1, wherein the covering sheeet is selected from the group consisting of cloth and paper.

4. The method of producing a three-dimensional art object of claim 3, wherein said covering sheet has on its visible surface a member selected from the group consisting of a photographic image and painted image.

5. The method of producing a three-dimensional art object of claim 1, wherein said covering sheet comprises photosensitive material which is subsequently processed to give a permanent image.

6. The method of producing a three-dimensional art object of claim 1, wherein a finishing material selected from the group consisting of paint and varnish is applied to said covering sheet.

7. The method of producing a three-dimensional art object of claim 1, wherein said art medium is selected from the group consisting of flexible synthetic resin, flexible clay, gypsum, flexible wood and flexible rubber.

* * * * *